INVENTOR.
Stephen Straty
BY
ATTORNEY.

Patented Aug. 16, 1932

1,872,357

UNITED STATES PATENT OFFICE

STEPHEN STRATY, OF MILWAUKEE, WISCONSIN, ASSIGNOR TO A. O. SMITH CORPORATION, OF MILWAUKEE, WISCONSIN, A CORPORATION OF NEW YORK

FORGED MANWAY CONSTRUCTION FOR PRESSURE VESSELS

Application filed August 11, 1930. Serial No. 474,479.

The present invention relates to manway construction for pressure vessels and more particularly to those fabricated by forging.

An object of the invention is to provide a novel manway of superior strength and one which may be easily installed.

Other objects will appear from the following description and claims.

The invention will be best understood by referring to the preferred embodiment thereof illustrated in the accompanying drawing in which.

Figure 1:
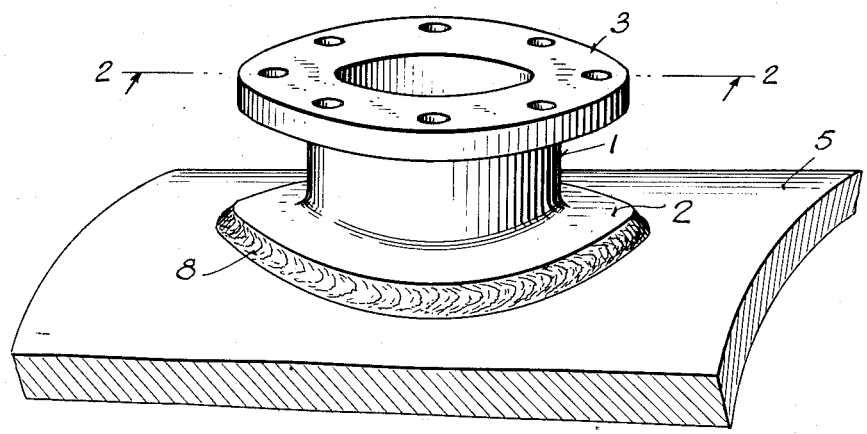
Figure 1 is a perspective view of the manway.
Figure 2:
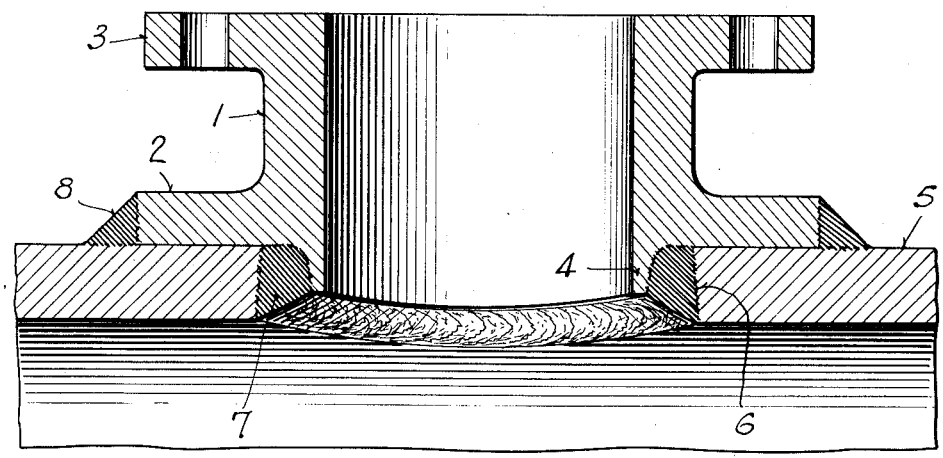
Fig. 2 is a longitudinal sectional view of the manway taken on the line 2—2 of Fig. 1.

The manway comprises in general a tubular body 1 having a thick walled reenforcing flange 2 forged integral therewith at the lower end thereof.

The upper end of the tubular body is forged to form a flange 3 providing a seat against which a corresponding flange of a connecting pipe or cover may be fastened.

The reenforcing flange 2 is adapted to seat against the outside of the vessel wall and to reenforce the same about the opening for the manway. For this purpose the flange is preferably curved to conform to the curvature of the vessel wall.

The manway is particularly adapted to be welded to the vessel wall and, in order to facilitate the welding operation, the present invention provides a thin lip 4 forged at the lower end of the tubular body 1 and extending axially downwardly therefrom. The lip 4 has an inner diameter corresponding to that of the tubular body 1 thereby providing an opening of uniform diameter for the manway.

In welding the manway to the vessel wall 5 an opening 6 of larger diameter than the outside diameter of the lip 4 is cut in the wall. The manway is then placed in position with the lip 4 extending downwardly in the opening and the reenforcing flange 2 resting on the outside of the vessel wall.

The lip 4 cooperates with the edge of the vessel wall 5 at the opening 6 to provide a welding groove for receiving deposited weld metal 7 during the welding operation.

The outer circumference of the reenforcing flange 2 is also welded to the vessel wall by weld metal 8.

The lip 4 is preferably sufficiently thin to provide a flexible side wall for the welding groove as set forth in co-pending application Serial No. 356,421 filed by Thomas McLean Jasper and assigned to the same assignee as the present application.

The flexibility of the lip allows for contraction of the weld metal upon cooling and prevents the setting up of excessive injurious tension stresses in the weld and plate metal adjacent thereto.

The present invention is directed more particularly to the integral construction of the manway in which the tubular body 1, reenforcing flange 2, connecting flange 3, and lip 4 are forged from an integral piece of metal thereby providing a manway of superior strength and quality and which is less subject to injury from welding stresses.

Various modifications may be employed within the scope of the appended claims.

I claim:

1. A forged manway for pressure vessels comprising a tubular body, a reenforcing flange at one end thereof, said flange being curved to conform to the curvature of the vessel wall to which the manway is to be attached, a connecting flange at the other end of said body, and a thin circular lip at the inner edge of said reenforcing flange adapted to extend into an opening in the vessel wall and to provide a welding groove therewith, said tubular body, flanges, and lip being forged from a single integral billet.

2. In combination, a thick walled pressure vessel and a connector comprising a tubular body, a thin flexible lip integral with and at the lower end of said body, and a reenforcing flange integral with and extending circumferentially of the tubular body intermediate the ends thereof, said flexible lip and the wall of the vessel cooperating to form an annular pocket for welding metal, and welding metal deposited in said pocket and about the outer edge of the reenforcing flange to join said connector to the vessel wall.

3. In combination with a thick walled pressure vessel, a connector comprising a tubular body, an integral reenforcing flange extending outwardly from the body and seated against the vessel wall, a relatively thin lip at the lower end of the body cooperating with the wall of the vessel to form a welding groove, and welding metal deposited in said groove and about the outer edge of the reenforcing flange to unite the connector and the pressure vessel.

In witness whereof I have hereunto signed my name at Milwaukee, Wisconsin, this 6th day of August, 1930.

STEPHEN STRATY.